United States Patent [19]

Back et al.

[11] Patent Number: 4,874,849

[45] Date of Patent: Oct. 17, 1989

[54] ASYMMETRIC 1:2-CHROMIUM COMPLEX DYES CONTAINING TWO AZO DYES, ONE CONTAINING AN ACETOACETANILIDE COUPLING COMPONENT

[75] Inventors: Gerhard Back, Lörrach, Fed. Rep. of Germany; Fabio Beffa, Riehen, Switzerland; Ulrich Schlesinger, Binzen, Fed. Rep. of Germany; Alois Püntener, Rheinfelden, Switzerland

[73] Assignee: Ciba-Geigy Corporation, Ardsley, N.Y.

[21] Appl. No.: 944,621

[22] Filed: Dec. 19, 1986

[30] Foreign Application Priority Data

Dec. 23, 1985 [CH] Switzerland ................... 5517/85
Dec. 23, 1985 [CH] Switzerland ................... 5514/85

[51] Int. Cl.⁴ .............. C09B 45/06; C09B 45/16; C09B 45/26; C09B 45/48
[52] U.S. Cl. .................. 534/696; 534/697; 534/699; 534/700; 534/690; 534/693; 534/684
[58] Field of Search ............... 534/696, 697, 684, 700, 534/699, 690, 693

[56] References Cited

U.S. PATENT DOCUMENTS

| | | | |
|---|---|---|---|
| 3,221,003 | 11/1965 | Scholl et al. | 534/696 X |
| 3,516,980 | 6/1970 | Dore et al. | 534/696 X |
| 4,000,965 | 1/1977 | Meninecke et al. | 534/696 X |
| 4,113,719 | 9/1978 | Fuchs et al. | 534/700 |
| 4,118,381 | 10/1978 | Fuchs et al. | 634/700 |
| 4,145,339 | 3/1979 | Fuchs et al. | 634/700 |
| 4,625,017 | 11/1986 | Püntener | 534/741 |

FOREIGN PATENT DOCUMENTS

| | | | |
|---|---|---|---|
| 0810207 | 3/1959 | United Kingdom | 534/700 |
| 1001840 | 8/1965 | United Kingdom | 534/696 |

Primary Examiner—Floyd D. Higel
Attorney, Agent, or Firm—Edward McC. Roberts; Meredith C. Findlay

[57] ABSTRACT

Dyes suitable for dyeing wool, polyamide and leather in orange, brown or olive-brown shades are disclosed, the dyes having the formula

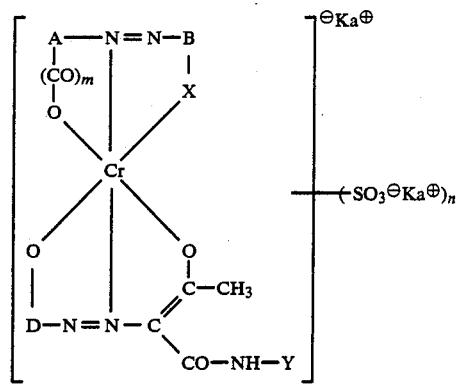

wherein
A and D are each independently of the other a benzene or napththalene radical of a diazo component, which component carries the hydroxyl or carboxyl group in the ortho-position to the azo group;
B is the radical of a coupling component which carries the group X adjacent to the azo group;
X is oxygen or a radical of the formula —NR—, in which R is hydrogen or $C_1$-$C_4$alkyl;
Y is a radical of the formula

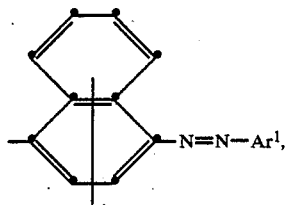

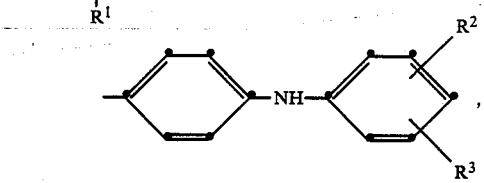

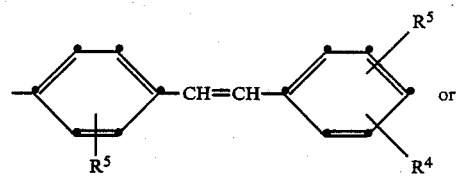

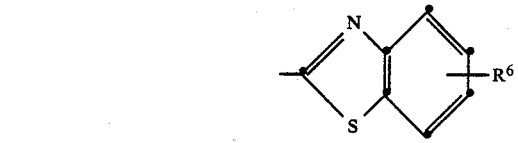

in which formulae
$R^1$ and $R^5$ are each independently of the other hydrogen or sulfo, $R^4$ is hydrogen or nitro, $R^6$ is hydrogen, methyl, methoxy or chlorine and $R^2$ and $R^3$ are each independently of the other hydrogen, halogen, nitro or sulfo;
$Ar^1$ is a benzene or napththalene radical which is unsubstituted or substituted by halogen, nitro, sulfo, $C_1$-$C_4$-alkyl or $C_1$-$C_4$-alkoxy;
m is 0 or 1;
n is an integer from 1 to 7; and
$Ka^\oplus$ is a cation.

21 Claims, No Drawings

ASYMMETRIC 1:2-CHROMIUM COMPLEX DYES CONTAINING TWO AZO DYES, ONE CONTAINING AN ACETOACETANILIDE COUPLING COMPONENT

The present invention relates to 1:2-chromium complex dyes of the formula

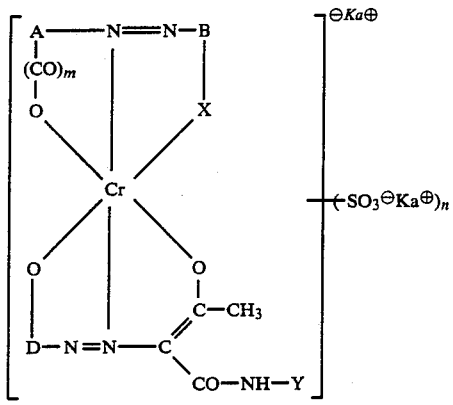

wherein

A and D are each independently of the other the radical of a diazo component of the benzene or naphthalene series, which component carries the hydroxyl or carboxyl group in the ortho-position to the azo group, B is the radical of a coupling component which carries the group X adjacent to the azo group, X is oxygen or a radical of the formula —NR—, in which R is hydrogen or $C_1$–$C_4$alkyl, Y is a radical of the formula

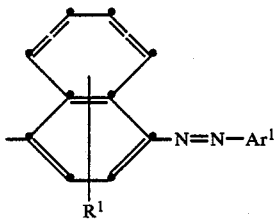

or of the formula

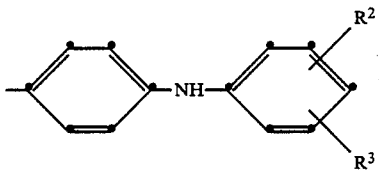

or of the formula

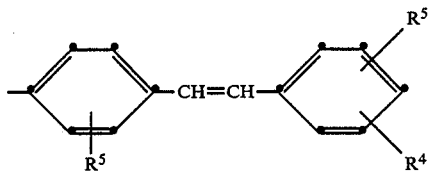

or of the formula

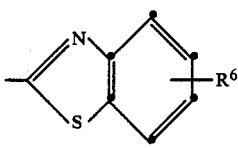

in which formulae $R^1$ and $R^5$ are each independently of the other hydrogen or sulfo, $R^4$ is hydrogen or nitro, $R^6$ is hydrogen, methyl, methoxy or chlorine and $R^2$ and $R^3$ are each independently of the other hydrogen, halogen, nitro or sulfo, $Ar^1$ is the radical of an unsubstituted or substituted heterocyclic or carbocyclic aromatic amine, m is 0 or 1, n is an integer from 1 to 7 and $Ka^\oplus$ is a cation.

The broken line in formula (2) indicates that a further benzene ring may be fused to the radical.

In the chromium complex dyes of the above formula (1), the radicals A and D may additionally carry one or more further substituents, for example low molecular alkyl or alkoxy, halogen, e.g. chlorine or bromine, nitro, cyano, sulfo, carboxy, phosphone, alkylsulfonyl, e.g. methylsulfonyl, sulfamides, e.g. sulfamide or N-methylsulfamide, or acylamino. Throughout this specification, low molecular alkyl or alkoxy groups shall generally be understood as meaning those groups which contain 1 to 6, preferably 1 or 2, carbon atoms; and the term "acylamino" denotes low molecular alkanyolamino, alkysulfonylamino and alkoxycarbonylamino radicals as well as aroylamino and arylsulfonylamino radicals.

The radicals A and D are derived for example from the following amines: anthranilic acid, 4- or 5-chloroanthranilic acid, 4-or 5-sulfoanthranilic acid, 2-amino-3-naphthoic acid, 2-amino-1-hydroxybenzene, 4-chloro- and 4,6-dichloro-2-amino-1-hydroxybenzene, 4- or 5-nitro-2-amino-1-hydroxybenzene, 4-chloro-, 4-methyl- and 4-acetylamino-6-nitro-2-amino-1-hydroxybenzene, 6-acetylamino- and 6-chloro-4-nitro-2-amino-1-hydroxybenzene, 4-cyano-2-amino-1-hydroxybenzene, 4-sulfonamido-2-amino-1-hydroxybenzene, 1-hydroxy-2-aminobenzene-4-sulfoanthranilide, 4-methoxy-2-amino-1-hydroxybenzene, 4-methoxy-5-chloro-2-amino-1-hydroxybenzene, 4-methyl-2-amino-1-hydroxybenzene, 4-chloro-5-nitro-2-amino-hydroxybenzene, 3,4,6-trichloro-2-amino-1-hydroxybenzene, 6-acetylamino-4-chloro-2-amino-1-hydroxybenzene, 4,6-dinitro-2-amino-1-hydroxybenzene, 2-amino-1-hydroxybenzene-4-or -5-sulfonic acid, 4-nitro-2-amino-1-hydroxybenzene-6-sulfonic acid, 6-nitro-2-amino-1-hydroxybenzene-4-sulfonic acid, 4-chloro-2-amino-1- hydroxybenzene-6-sulfonic acid, 1-amino-2-hydroxynaphthalene-4-sulfonic acid, 1-amino-2-hydroxy-6-nitronaphthalene-4-sulfonic acid, 1-amino-2-hydroxy-6-chloronaphthalene-4-sulfonic acid, 1-amino-2-hydroxynaphthalene-4,6-disulfonic acid, 2-amino-1-hydroxybenzene-4,6-disulfonic acid.

Instead of the above hydroxylated amines, suitable contenders for A and D are also corresponding methoxy compounds or corresponding compounds whose hydroxyl group has been tosylated, for example anisidine, 4- or 5-chloroanisidine, 4- or 5-nitroanisidine, anisidine-4- or 5-sulfonic acid, or tosylated 1-hydroxy-2-aminobenzene, the methoxy or O-tosyl group of which is converted into an —OH group before or during metallising. Compounds containing these groups are used in particular whenever the corresponding 1-hydroxy-2-amino compounds couple reluctantly.

In preferred dyes of formula (1), each of A and D independently of the other is the radical of a 1-hydroxy-2-aminobenzene which is unsubstituted or substituted by halogen, nitro, sulfo or low molecular alkyl or alkoxy, or is the radical of a 1-amino-2-hydroxy-4-sulfonaphthalene which is unsubstituted or substituted in the 6-position by chlorine, nitro or sulfo.

In particularly preferred dyes of formula (1), D is a 1-hydroxy-2-aminobenzene which may be further substituted by nitro, sulfo, chlorine or methyl.

The radical B is derived preferably from the following groups of coupling components: phenols which couple in the ortho-position and which are unsubstituted or substituted by low molecular alkyl or alkoxy, dialkylamino or acylamino, where acylamino denotes $C_1$–$C_4$alkanoylamino, $C_1$–$C_4$alkylsulfonylamino, $C_1$–$C_4$alkoxycarbonylamino, aroylamino or arylsulfonylamino radicals; naphthols which are unsubstituted or substituted by $C_1$–$C_4$alkyl or $C_1$–$C_4$alkoxy, chlorine, amino, acylamino or sulfo, where acylamino is as defined above; 5-pyrazolones or 5-aminopyrazoles, preferably those which carry in the 1-position a phenyl or naphthyl radical, each unsubstituted or substituted by chlorine, nitro, $C_1$–$C_4$alkyl or $C_1$–$C_4$alkoxy groups or sulfo groups, and in the 3-position carry a $C_1$–$C_4$alkyl group or a carboxyl group, preferably a methyl group; naphthylamines which are unsubstituted or substituted by sulfo, sulfonamido or sulfone groups; acetoacetamides, preferably acetoacetanilides, and benzoylacetanilides which may be substituted in the anilide nucleus by chlorine, bromine, nitro, $C_1$–$C_4$alkyl or $C_1$–$C_4$alkoxy groups or sulfo groups; 6-hydroxy-3-cyano- or 6-hydroxy-3-carbamoyl-4-alkyl-2-pyridones which are substituted in the 1-position by unsubstituted or substituted $C_1$–$C_4$alkyl, for example methyl, isopropyl, β-hydroxyethyl, β-aminoethyl or γ-isopropoxypropyl or by phenyl, and in the 4-position can carry a $C_1$–$C_4$alkyl group, preferably methyl; or hydroxyquinolines, barbituric acid or substituted resorcinols of the formula

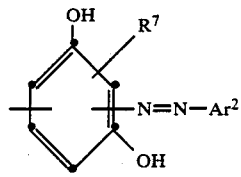

(6)

wherein $R^7$ is hydrogen, $C_1$–$C_4$alkyl, halogen, carboxy or sulfo and $Ar^2$ is the radical of an unsubstituted or substituted heterocyclic or carbocyclic amine.

Examples of such coupling components are: 2-naphthol, 1-naphthol, 1-acetylamino-7-naphthol, 1-propionylamino-7-naphthol, 1-carboxymethoxyamino-7-naphthol, 1-carboethoxyamino-7-naphthol, 1-carbopropoxyamino-7-naphthol, 6-acetyl-2-naphthol, 2-naphthol-3-, -4-, -5-, -6-, -7- or -8-sulfonic acid, 1-naphthol-3-, -4- or -5-sulfonic acid, 1-naphthol-3,6- or -4,8-disulfonic acid, 2-naphthol-6,8-disulfonic acid, 4-methyl-1-naphthol, 4-methoxy-1-naphthol, 4-methoxy-1-naphthol, 4-acetyl-1-naphthol, 5,8-dichloro-1-naphthol, 5-chloro-1-naphthol, 2-naphthylamine, 2-naphthylamine-1-sulfonic acid, 1-naphthylamine-4- or -5-sulfonic acid, 2-aminonaphthalene-6-sulfonic acid, 2-aminonaphthalene-5-sulfonic acid, 6-methyl-sulfonyl-2-aminonaphthalene, 1-phenyl-3-methylpyrazol-5-one, 1-phenyl-5-pyrazolone-3-carboxamide, 1-(2'-, 3'- or 4'-methylphenyl)-3-methylpyrazol-5-one, 1-(2'-, 3'- or 4'-sulfophenyl)-3-methylpyrazol-5-one, 1-(2'-chloro-5'-sulfophenyl)-3-methylpyrazol-5-one, 1-(2'- or 4'-methoxyphenyl)-3-methylpyrazol-5-one, 1-(2'-, 3'- or 4'-chlorophenyl)-3-methylpyrazol-5-one, 1-(2'-, 3'- or 4'-nitrophenyl)-3-methylpyrazol-5-one, 1-(2',5'- or 3',4'-dichlorophenyl)-3-methylpyrazol-5-one, 1-(2',5'-dichloro-4'-sulfophenyl)-3-methylpyrazol-5-one, 1-(2'-, 3'- or 4'-sulfophenyl)-3-methyl-aminopyrazole, 1-phenyl-3-methyl-5-aminopyrazole, 1-(2'-chloro-5'-sulfophenyl)-3-methyl-5-aminopyrazole, acetoacetanilide, acetoacetanilide-4-sulfonic acid, acetoacet-o-anisidide, acetoacet-o-toluidide, acetoacet-o-chloroanilide, acetoacet-m-xylidide, tetralol, 4-methylphenol, 3-dialkylaminophenols, preferably 3-dimethylamino and 3-diethylaminophenol, 4-butylphenol, preferably 4-tert-butylphenol, 4-amylphenol, most preferably 4-tert-amylphenol, 2-isopropyl-4-methylphenol, 2- or 3-acetylamino-4-methylphenol, 2-methoxycarbonylamino-4-methylphenol, 2-ethoxycarbonylamino-4-methylphenol and 3,4-dimethylphenol, 1-methyl-3-cyano-4-ethyl-6-hydroxypyridone, 1-methyl-3-cyano-4-methyl-6-hydroxypyridone, 1-phenyl-3-carbamoyl-4-methyl-6-hydroxypyridone, 1-ethyl-4-hydroxy-2-quinoline, 2,4-dihydroxyquinoline, barbituric acid or 3-methylpyrazol-5-one.

Preferably the coupling component B is a 1- or 2-naphthol which is unsubstituted or substituted by amino and/or sulfo; a substituted resorcinol of the above formula (6); 1- or 2-naphthylamine, unsubstituted or substituted by sulfo; p-$C_1$–$C_6$alkylphenol, 3-methyl-5-pyrazolone, 1-phenyl-3-methyl-5-pyrazolone or acetoacetanilide, the phenyl moiety of which last two compounds may be substituted by $C_1$–$C_4$alkyl, $C_1$–$C_4$alkoxy, chlorine, nitro or sulfo. A particularly preferred coupling component is 2-naphthol and a further particularly preferred coupling component is a substituted resorcinol of the above formula (6).

In the 1:2 chromium complex dyes of formula (1), Y is a radical of the formula

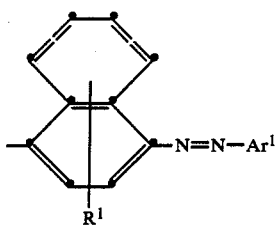

(2)

or of the formula

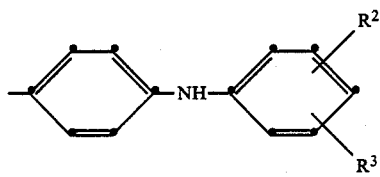

(3)

or of the formula

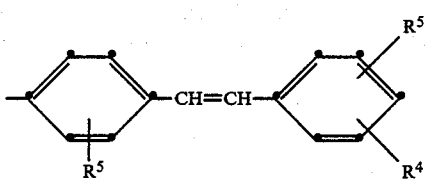

(4)

or of the formula

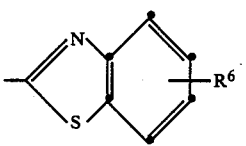

(5)

The radical of formula (2) is preferably a phenylene radical substituted by $-N=N-Ar^1$.

$R^1$ is preferably hydrogen, $R^4$ is preferably nitro and $R^5$ is preferably sulfo. The substituents $R^2$ and $R^3$ are preferably different from each other and are each sulfo or nitro. These substituents are preferably in the ortho- and para-positions to the $-NH-$ group.

The radicals $R^5$ are preferably in the ortho-position to the vinylene group, and the radical $R^4$ is preferably in the para-position to the vinylene group.

$R^6$ is preferably methyl and is most preferably hydrogen.

A group of suitable complex dyes of formula (1) comprises those in which Y is a radical of the above formula (5); dyes of formula (1) in which Y is a radical of one of the above formulae (2), (3) or (4) constitute a further group of useful complex dyes; in this case Y is preferably a radical of formula (2) or (3).

Each of $Ar^1$ and $Ar^2$ independently of the other is the radical of an unsubstituted or substituted heterocyclic or carbocyclic aromatic amine. Examples of possible substituents are halogen, e.g. bromine or, preferably, chlorine, nitro, sulfo, $C_1-C_4$alkyl, $C_1-C_4$alkoxy.

Each of $Ar^1$ and $Ar^2$ independently of the other is preferably a radical of the benzene or naphthalene series, which radical is unsubstituted or substituted by one of the substituents listed above.

Particularly preferred groups $Ar^1$ and $Ar^2$ are phenyl which is unsubstituted or substituted by chlorine, nitro, methyl, methoxy or sulfo, and naphthyl which is unsubstituted or substituted by sulfo.

The 1:2-chromium complexes of formula (1) carry 1 to 7, preferably 1 to 3, sulfo groups.

$Ka^\oplus$ is a cation, for example an alkali metal cation such as lithium or, preferably, potassium or sodium. $Ka^\oplus$ may also be an ammonium cation or the ammonium salt of an organic amine.

A preferred embodiment of the present invention relates to 1:2-chromium complexes of formula (1), wherein A, D, X, $Ka^\oplus$, m and n are as defined above, with the indicated preferences being applicable, B is the radical of a coupling component which carries the group X adjacent to the azo group and which carries no further substituent bonded through an azo group, and Y is a radical of one of the above formulae (2), (3) or (4).

A further preferred embodiment of the present invention relates to dyes of the formula (1), wherein A, D, $Ka^\oplus$, m and n are as defined above, with the indicated preferences being applicable, X is oxygen, B is the radical of a substituted resorcinol of the formula

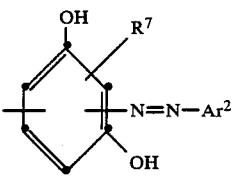

(6)

wherein $Ar^2$ and $R^7$ are each as defined above and Y is a radical of one of the above formulae (2), (3) or (4).

1:2-Chromium complex dyes which are of particular importance on account of their good dyeing properties are those of the formula

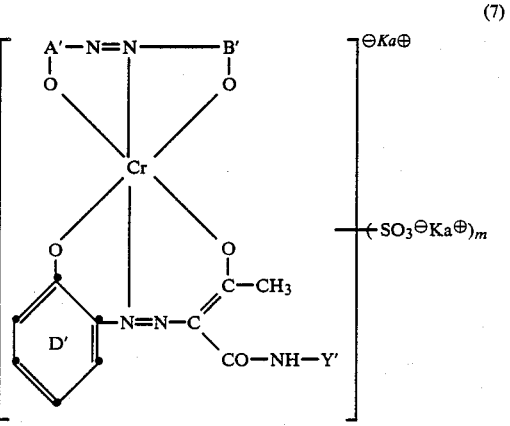

(7)

wherein

A' is the radical of a 1-hydroxy-2-aminobenzene which is unsubstituted or substituted by halogen, nitro, sulfo or low molecular alkyl or alkoxy, or is the radical of a 1-amino-2-hydroxy-4-sulfonaphthalene which is unsubstituted or substituted in the 6-position by nitro, B' is a 1- or 2-naphthol which is unsubstituted or substituted by amino and/or sulfo; a 1- or 2-naphthylamine which is unsubstituted or substituted by sulfo; or is p-$C_1$-$C_6$alkylphenol, 1-phenyl-3-methyl-5-pyrazolone or acetoacetanilide, the phenyl moiety of which last two compounds may be substituted by $C_1$-$C_4$alkyl, $C_1$-$C_4$alkoxy, chlorine, nitro or sulfo, Y' is a radical of the formula

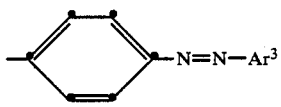

(8)

or of the formula

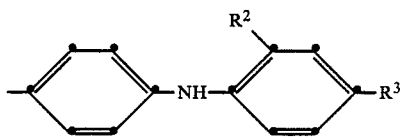

(9)

or of the formula

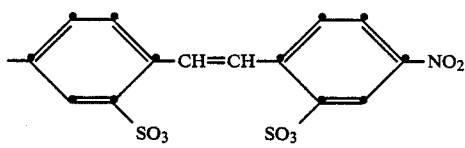

(10)

in which formulae $Ar^3$ is a radical of the benzene or naphthalene series, which radical is unsubstituted or substituted by chlorine, nitro, sulfo, $C_1$-$C_4$alkyl or $C_1$-$C_4$alkoxy, and $R^2$ and $R^3$ are different from each other and are each nitro or sulfo, m is 1, 2 or 3, $Ka^\oplus$ is a cation, and the ring D' may be further substituted by sulfo, nitro, chlorine, methyl or methoxy.

A further group of dyes with particularly good dyeing properties comprises dyes of the formula

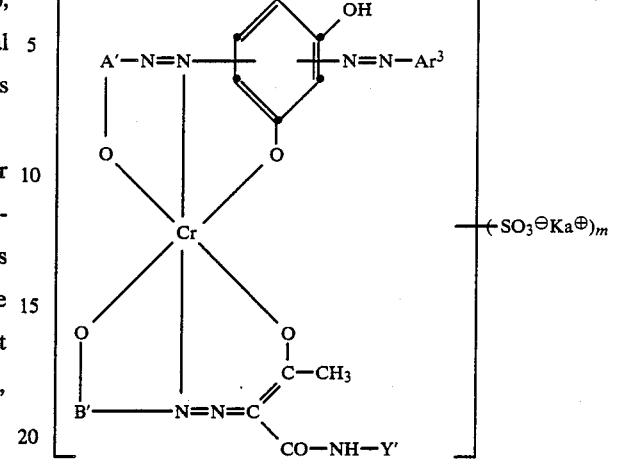

(11)

wherein A', $Ka^\oplus$, Y' and m are as defined for formula (7) and $Ar^3$ is as defined for formula (8) and B', independently of A', has one of the meanings indicated for A'.

The dyes of the present invention can be prepared by methods known per se, for example by preparing the 1:1-chromium complex of a dye of the formula

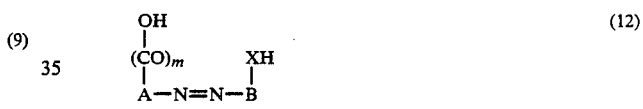

(12)

or of a dye of the formula

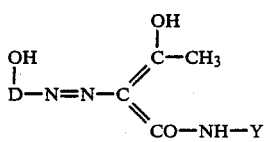

(13)

in which formulae A, B, X, Y, D and m are as defined for formula (1), and then reacting said complex with the non-metallised dye of formula (13) or (12).

If in the dyes of formula (1) the coupling component B is derived from a resorcinol derivative of the formula

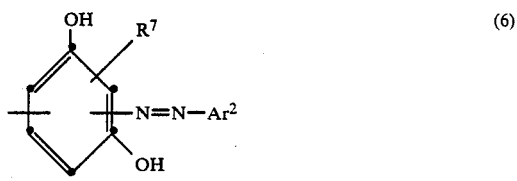

(6)

then it is advantageous to proceed by preparing the 1:1-chromium complex of a dye of the formula

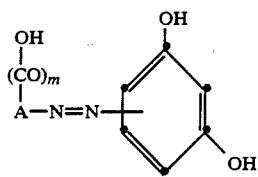

or of a dye of the formula

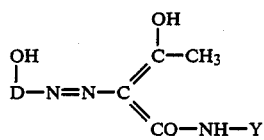

and then reacting said complex with the non-metallised dye of formula (13) or (14), in the course of which process either the resultant 1:2-chromium complex or the 1:1-chromium complex of the dye of formula (14) is coupled with about 1 mole of a diazonium compound of the formula $$Ar^2-N^{\oplus}\equiv N \ An^{\ominus} \qquad (15)$$

per mole of 1:2- or 1:1-chromium complex, in which formulae A, D, Y, $Ar^2$, $R^7$ and m are as defined above and $An^{\ominus}$ is an anion, e.g. chloride.

A preferred procedure comprises first preparing the 1:1-chromium complex of the dye of formula (14), coupling said complex with a diazonium compound of formula (15) and subsequently reacting the resultant 1:1-chromium complex of the disazo dye with a dye of formula (13) to give the 1:2-chromium complex.

The 1:1-chromium complex is prepared by methods known per se by treating the one azo dye, preferably in acid solution, with chromium(III) salts. The 1:1-chromium complex of said azo dye is then reacted in weakly acid, neutral or weakly alkaline medium with the second, i.e. non-metallised, azo dye.

A mixture of the azo dyes of formulae (12) and (13) or of the azo dyes of formulae (13) and (14) may also be reacted with a chroming agent. In this case, a mixture of 1:2-complexes is formed, which mixture, in addition to containing the chromium complex of formula (1), also contains the two symmetric 1:2-complexes, one of which contains two molecules of the dye of formula (13) and the other of which contains two molecules of the dye of formula (12) or (14).

The dyes of formulae (12), (13) and (14) are known or they are prepared in a manner which is in principle known.

The dyes of formula (13) are obtained e.g. by reacting an amine of the formula $$Y-NH_2 \qquad (16)$$

wherein Y is as defined for formula (1), with diketene in aqueous solution or in an organic solvent, at a temperature in the range from 20° to 90° C., preferably from 40° to 60° C., and at a pH value in the range from 3 to 9, preferably from 5 to 6, and coupling the resultant N-acetoacetyl compound of the general formula

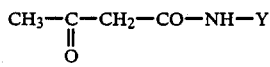

with a diazotised amine of the formula

wherein D is as defined for formula (1), at a temperature in the range from −10° to +40° C. and at a pH value in the range from 7 to 10, preferably from 8 to 9, to give an azo dye of the general formula (13).

The novel chromium complex dyes of formula (1) obtainable by the above processes are isolated in the form of their salts, preferably alkali metal or alkaline earth metal salts, most preferably sodium or lithium salts, or also ammonium salts or salts of organic amines containing a positively charged nitrogen atom, and are suitable for dyeing and printing a variety of materials, in the absence or presence of a levelling agent. They are suitable especially for dyeing or printing nitrogen-containing materials such as silk, wool, and also synthetic polyamide fibres and, in particular, furs or leather.

For example, orange, brown, olive-brown or violet brown dyeings with good fastness properties, in particular to light and wetness, are obtained.

The preferred area of application of the dyes of the invention is the dyeing of wool, polyamide and, in particular, furs or leather, all types of leather being suitable, e.g. chrome leather, retanned leather or suède leather made from goatskin, cowhide or pigskin. The dyes of the invention are suitable especially for the dyeing of leather with dye mixtures, in which case the dyes of the invention are employed in particular in admixture with one or more suitable 1:2-metal complex dyes.

The invention is illustrated by the following non-limitative Examples. Parts and percentages are by weight.

EXAMPLE 1

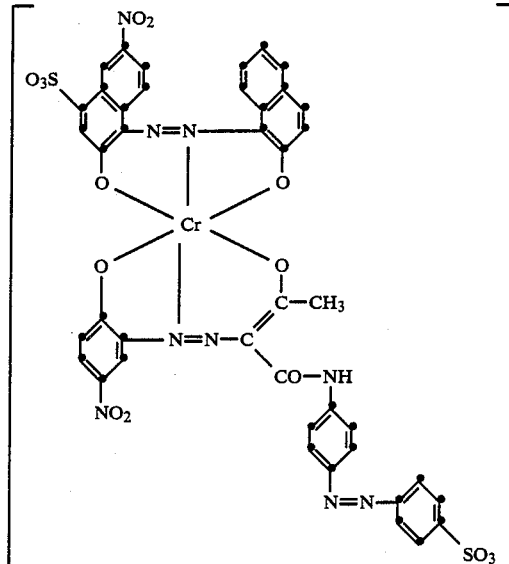

The 1:1-chromium complex, which contains 43.9 parts of the dye obtained from diazotised 6-nitro-1-amino-2-hydroxynaphthalene-4-sulfonic acid and 2-hydroxynaphthalene as well as 5.2 parts of chromium, is added to 500 parts of ethylene glycol. Then 52.6 parts of the dye obtained from diazotised 4-nitro-2-amino-1-hydroxybenzene and the condensation product obtained from diketene and 4,4'-aminoazobenzenesulfonic acid are added. The reaction mixture is subsequently heated to 80°–85° C., and the pH is adjusted to 7 with sodium hydroxide. The reaction mixture is kept at this temperature and at constant pH until the starting materials have disappeared. When the reaction is complete, the dye is precipitated by adding sodium chloride solution, then isolated by filtration and dried. After drying, the dye is in the form of a dark powder which dissolves in water to give a brown solution and which dyes leather in brown shades with good fastness properties.

EXAMPLE 2

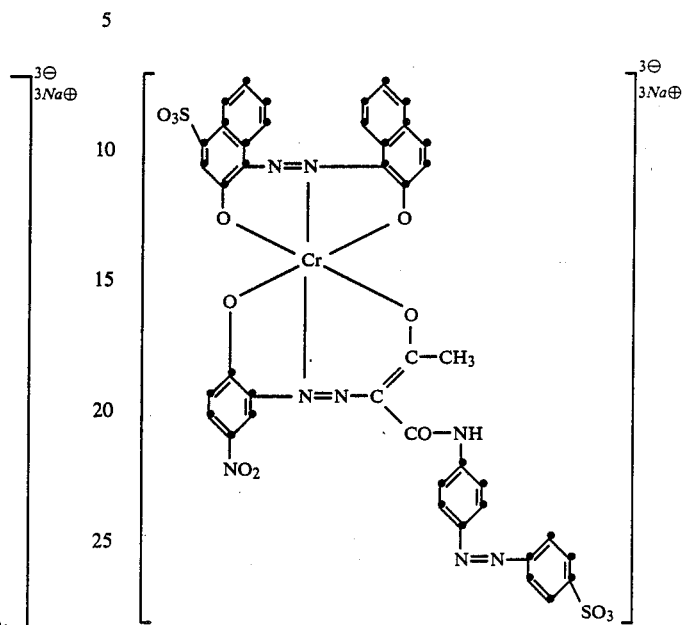

44.4 parts of the chromium complex compound of the type 1 atom of chromium: 1 molecule of dye, which compound contains 5.2 parts of chromium and 39.4 parts of monoazo dye obtained from diazotised 1-amino-2-hydroxynaphthalene-4-sulfonic acid and 2-hydroxynaphthalene, are suspended in 600 parts of water. Then 52.6 parts of the dye obtained from diazotised 4-nitro-2-amino-1-hydroxybenzene and the condensation product obtained from diketene and 4,4'-aminoazobenzenesulfonic acid are added. The reaction mixture is subsequently heated to 80°–85° C., and the pH is adjusted to 7–7.5 with sodium hydroxide. The reaction mixture is kept at this temperature and at constant pH until no more starting materials can be detected. When the reaction is complete, the dye is precipitated by adding sodium chloride solution and then isolated by filtration. After drying, the dye is in the form of a dark powder which dissolves in water to give a brown solution and which dyes leather in fast brown shades.

EXAMPLE 3

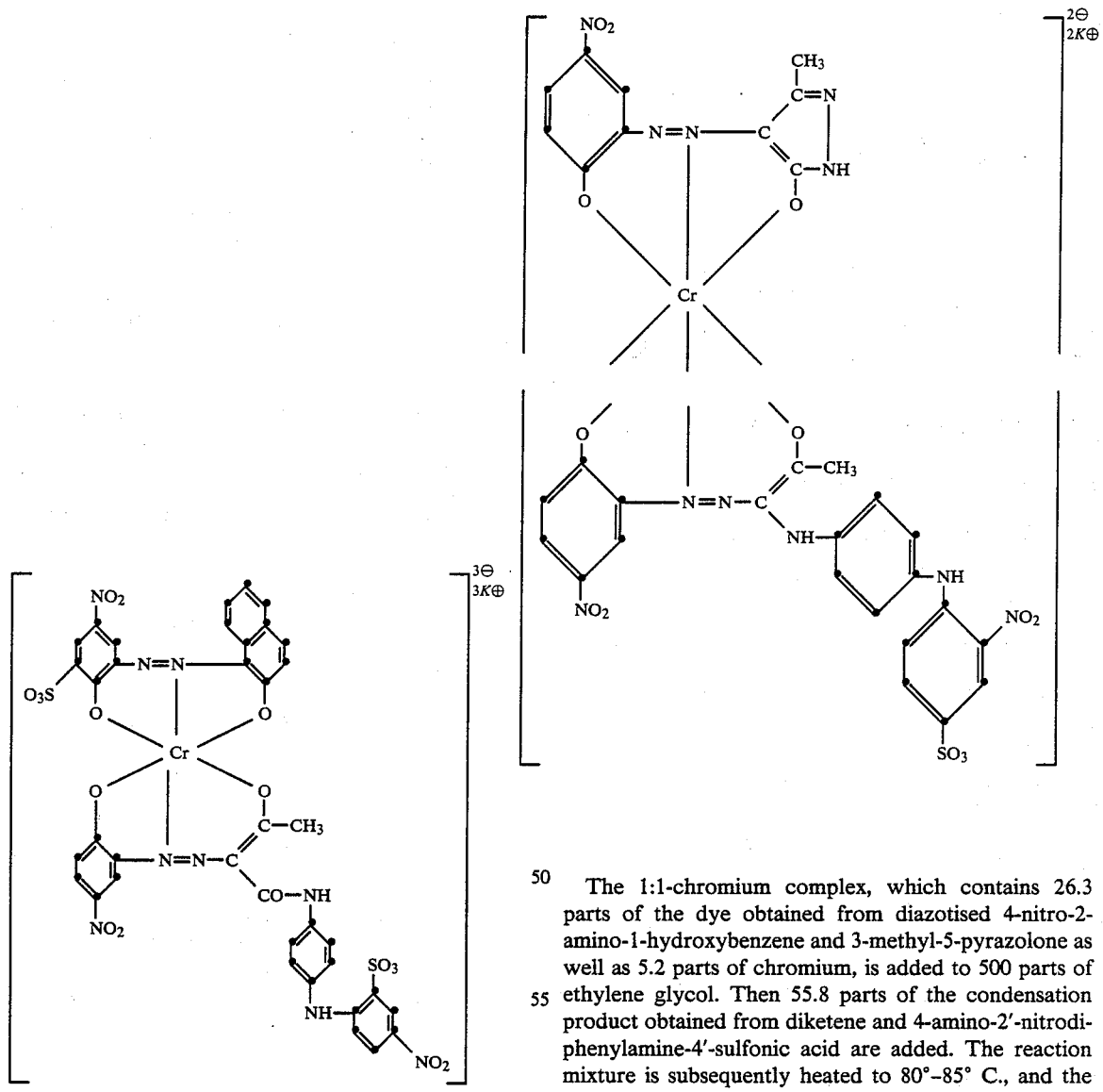

The 1:1-chromium complex, which contains 38.9 parts of the dye obtained from diazotised 4-nitro-2-amino-1-hydroxybenzene-6-sulfonic acid and 2-hydroxynaphthalene, is added to 500 parts of ethylene glycol. Then 55.8 parts of the dye obtained from diazotised 4-nitro-2-amino-1-hydroxybenzene and the condensation product obtained from diketene and 4-amino-4'-nitrodiphenylamine-2'-sulfonic acid are added. The reaction mixture is subsequently heated to 80°–85° C., and the pH is adjusted to 7 with potassium hydroxide. The reaction mixture is kept at this temperature and at constant pH until the starting materials have disappeared. When the reaction is complete, the dye is precipitated by adding potassium chloride solution, then isolated by filtration and dried. After drying, the dye is in the form of a dark powder which dissolves in water to give a brown solution and which dyes leather in fast brown shades.

EXAMPLE 4

The 1:1-chromium complex, which contains 26.3 parts of the dye obtained from diazotised 4-nitro-2-amino-1-hydroxybenzene and 3-methyl-5-pyrazolone as well as 5.2 parts of chromium, is added to 500 parts of ethylene glycol. Then 55.8 parts of the condensation product obtained from diketene and 4-amino-2'-nitrodiphenylamine-4'-sulfonic acid are added. The reaction mixture is subsequently heated to 80°–85° C., and the pH is adjusted to 7–7.5 with potassium hydroxide. The reaction mixture is kept at this temperature and at constant pH until the starting materials have disappeared. When the addition reaction is complete, the dye is precipitated by adding potassium chloride solution, then isolated by filtration and dried. After drying, the dye is in the form of a dark powder which dissolves in water to give an orange solution and which dyes leather in brownish orange shades with good fastness properties.

EXAMPLES 5 to 44

Table 1 below shows further 1:2-chromium complex dyes which can be obtained from the azo dyes in columns I and II in accordance with the procedures stated in Examples 1 to 4. The dyes dye leather, wool and polyamide in the shade indicated in the final column with good fastness properties.

TABLE 1

| Ex. | I | II | Shade |
|---|---|---|---|
| 5 | (structure) | (structure) | brown |
| 6 | (structure) | (structure) | violet brown |
| 7 | (structure) | (structure) | violet brown |
| 8 | (structure) | (structure) | orange |
| 9 | (structure) | (structure) | brown |
| 10 | (structure) | (structure) | orange |
| 11 | (structure) | (structure) | brown |

TABLE 1-continued

| Ex. | I | II | Shade |
|---|---|---|---|
| 12 | (structure) | (structure) | olive-brown |
| 13 | (structure) | (structure) | orange |
| 14 | (structure) | (structure) | brown |
| 15 | (structure) | (structure) | brown |
| 16 | (structure) | (structure) | brown |
| 17 | (structure) | (structure) | brown |
| 18 | (structure) | (structure) | orange |

TABLE 1-continued

| Ex. | I | II | Shade |
|---|---|---|---|
| 19 | (structure) | (structure) | brown |
| 20 | (structure) | (structure) | dark brown |
| 21 | (structure) | (structure) | brownish olive |
| 22 | (structure) | (structure) | dark brown |
| 23 | (structure) | (structure) | brown |
| 24 | (structure) | (structure) | brown |
| 25 | (structure) | (structure) | brown |

TABLE 1-continued

| Ex. | I | II | Shade |
|---|---|---|---|
| 26 | (structure) | (structure) | orange |
| 27 | (structure) | (structure) | orange |
| 28 | (structure) | (structure) | brown |
| 29 | (structure) | (structure) | brown |
| 30 | (structure) | (structure) | brown |
| 31 | (structure) | (structure) | brown |
| 32 | (structure) | (structure) | brown |

TABLE 1-continued

| Ex. | I | II | Shade |
|---|---|---|---|
| 33 | | | brown |
| 34 | | | brown |
| 35 | | | brown |
| 36 | | | olive-brown |
| 37 | | | orange |
| 38 | | | brown |
| 39 | | | olive-brown |

TABLE 1-continued

| Ex. | I | II | Shade |
|-----|---|----|----|
| 40 | [structure: 2-hydroxy-4-nitrophenyl-azo-pyrazolone with CH3, SO3H-phenyl] | [structure: 2-hydroxy-4-nitrophenyl-N=N-C(OH)=C(CH3)-CO-NH-phenyl-NH-phenyl(SO3H)(NO2)] | orange |
| 41 | [structure: 3-nitro-2-hydroxy-5-sulfo-phenyl-azo-2-hydroxynaphthyl] | [structure: 2-hydroxy-4-nitrophenyl-N=N-C(OH)=C(CH3)-CO-NH-phenyl-NH-phenyl(SO3H)(NO2)] | brown |
| 42 | [structure: 2-hydroxy-4-nitrophenyl-azo-2-hydroxy-5-tert-pentylphenyl] | [structure: 2-hydroxy-4-nitrophenyl-N=N-C(OH)=C(CH3)-CO-NH-phenyl-NH-phenyl(SO3H)(NO2)] | brown |
| 43 | [structure: 2-hydroxy-4-nitrophenyl-azo-2-hydroxy-5-tert-butylphenyl] | [structure: 2-hydroxy-4-nitrophenyl-N=N-C(OH)=C(CH3)-CO-NH-phenyl-NH-phenyl(SO3H)(NO2)] | brown |
| 44 | [structure: 3-sulfo-2-hydroxy-5-nitro-phenyl-azo-2-hydroxy-5-tert-butylphenyl] | [structure: 2-hydroxy-4-nitrophenyl-N=N-C(OH)=C(CH3)-CO-NH-phenyl-NH-phenyl(SO3H)(NO2)] | brown |

EXAMPLE 45

40.5 parts of the monoazo dye obtained from 1-diazo-2-hydroxy-6-nitronaphthalene-4-sulfonic acid and 1,3-dihydroxybenzene, which dye can be prepared by a known method, are suspended in 500 parts of water of 60° C. and then acidified to pH 2 by the addition of 30 parts of 2 n sulfuric acid. After the introduction of 22 parts of basic chromium(III) sulfate, the reaction mixture is brought to the boil and subsequently stirred under reflux until the metal-free monoazo dye can no longer be detected.

After cooling to 50° C., the reddish violet 1:1-chromium complex of the monoazo dye, which complex is in the form of a crystalline precipitate, is isolated by filtration and washed with dilute sodium chloride solution until acid-free.

With stirring, the 1:1-chromium complex, which is in the form of a filter paste, is suspended in 1000 parts of water. The suspension is then converted into a reddish violet clear solution of pH 9–9.5 by the dropwise addition of a 15% sodium hydroxide solution. 250 parts of ice are added and then, with additional ice cooling using an ice water bath, a solution of benzenediazonium chloride, prepared in conventional manner from 11.6 parts of 1-aminobenzene, is added dropwise, with anhydrous sodium carbonate being strewn in simultaneously to keep the pH value at 8.5–9.5. Part of the resultant bluish black 1:1-chromium complex of the disazo dye precipitates in the course of several hours. The addition of sodium chloride brings the precipitation to completion. The dye paste obtained after filtration is washed with dilute sodium chloride solution until acid-free, pressed and suspended in 2000 parts of water of 90° C. With stirring at 90°–95° C. and maintaining the pH at 7.0–7.5, about 44 parts of the monoazo dye obtained from diazotised 1-hydroxy-2-amino-4-nitrobenzene-6-sulfonic acid and 4'-phenylazoacetoacetanilide, which dye can be prepared in customary manner, are added to the resultant suspension, thereby initiating a reaction affording the homogeneous asymmetric chromium complex of the following constitution:

in 1000 parts of water of 90° C. Sufficient 1 n sodium hydroxide solution is added to ensure a constant pH value of 7.0–7.5, after which the reaction mixture is stirred at 90°–95° C. until both starting materials can no longer be detected.

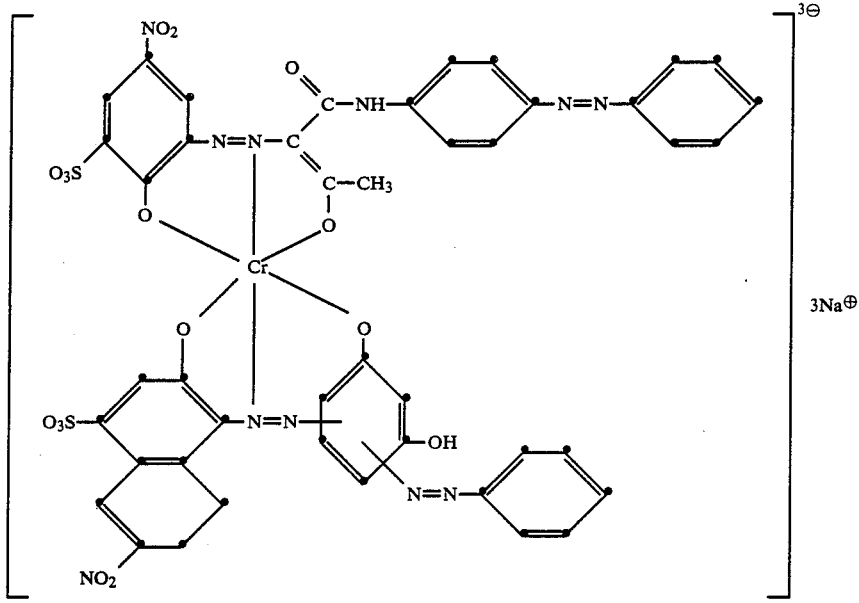

The reaction is controlled by thin-layer chromatography and, if necessary, corrected until both starting components of the mixture have been completely reacted.

The novel complex dye, which is in the form of a brownish black solution, is isolated by concentrating the reaction mass. The yield comprises about 170 parts of a dye which readily dissolves in water to give a dark brown solution and which dyes chrome leather and retanned leather in full, fast dark brown shades in accordance with the procedures indicated in the Dyeing Examples.

EXAMPLE 46

45.5 parts of the monoazo dye (prepared according to Example 45) obtained from 1-diazo-2-hydroxy-6-nitronaphthalene-4-sulfonic acid and 1,3-dihydroxybenzene, in the form of the 1:1-chromium complex containing 1 atom of chromium to 1 molecule of azo dye, and 44.2 parts of the monoazo dye obtained from diazotised 1-hydroxy-2-amino-4-nitrobenzene-6-sulfonic acid and 4-acetoacetylaminoazobenzene are suspended together The resultant brownish violet solution of the homogeneous mixed complex is cooled to 5°–10° C., and 12 parts of anhydrous sodium carbonate are added. Subsequently, a solution of 4-chlorobenzenediazonium chloride, prepared in conventional manner from 12.75 parts of 1-amino-4-chlorobenzene, is added dropwise, the pH being simultaneously kept in the range from 7.5 to 8.5 with 4 n sodium carbonate solution.

When the coupling is complete, the resultant deep brown reaction solution is concentrated to dryness. The dye obtained has a constitution similar to that of the dye of Example 45 and dyes chrome leather, retanned leather or split suède leather in full, fast dark brown shades.

Table 2 below shows further complex dyes which can be obtained from the 1:1-complex dyes of column I and the azo dyes of column II in accordance with the procedures of Examples 45 and 46. Column III indicates the shade produced on leather.

TABLE 2

| Ex. | I | II | Shade |
|---|---|---|---|
| 47 | (structure) | (structure) | dark brown |

TABLE 2-continued

| Ex. | I | II | Shade |
|---|---|---|---|
| 48 | | | dark brown |
| 49 | | | dark brown |
| 50 | | | violet brown |
| 51 | | | reddish dark brown |
| 52 | | | dark brown |

TABLE 2-continued
| Ex. | I | II | Shade |
|---|---|---|---|
| 53 | 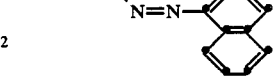 | 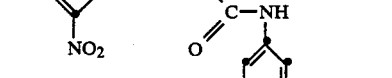 | reddish brown |
| 54 |  |  | brown |
| 55 |  | 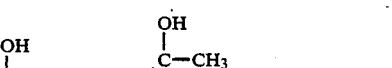 | violet brown |
| 56 | 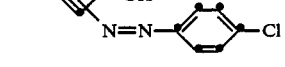 | 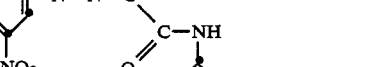 | dark brown |
| 57 |  | 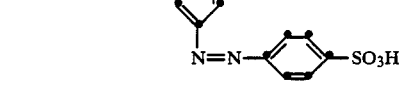 | violet brown |

TABLE 2-continued

| Ex. | I | II | Shade |
|---|---|---|---|
| 58 | (structure) | (structure) | brownish violet |
| 59 | (structure) | (structure) | olive-brown |
| 60 | (structure) | (structure) | dark brown |
| 61 | (structure) | (structure) | dark brown |

EXAMPLE 62

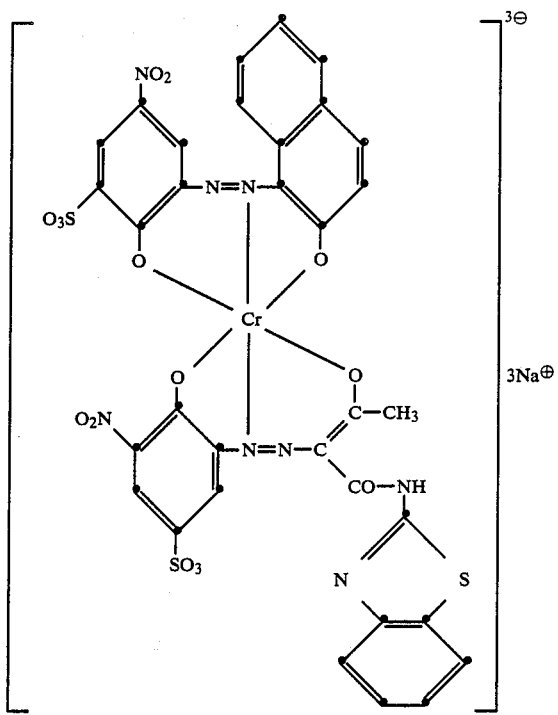

The 1:1-chromium complex, which contains 7.8 parts of the dye obtained from diazotised 4-nitro-2-amino-1-hydroxybenzene-6-sulfonic acid and 2-hydroxynaphthalene, is added to 200 parts of water. Then 9.6 parts of the dye obtained from diazotised 6-nitro-2-amino-1-hydroxybenzene-4-sulfonic acid and the condensation product obtained from diketene and 2-aminobenzthiazole are added. The reaction mixture is subsequently heated to 80°–85° C., and the pH is adjusted to 7 with sodium hydroxide solution. The reaction mixture is kept at this temperature and at constant pH until the starting materials have disappeared. When the reaction is complete, the dye is precipitated by adding sodium chloride solution, then isolated by filtration and dried. After drying, the dye is in the form of a dark powder which dissolves in water to give a reddish brown solution and which dyes leather in reddish brown shades with good fastness properties.

If potassium chloride is used for the salting out, then the dye is mostly obtained in the form of a potassium salt.

EXAMPLES 63–68

Table 3 below shows further 1:2-chromium complex dyes which can be obtained from the azo dyes of columns I and II in accordance with the procedure of Example 62.

The dyes dye leather, wool and polyamide in the shades indicated in the final column with good fastness properties.

TABLE 3

| Ex. | I | II | Shade |
|---|---|---|---|
| 63 | | | dark brown |
| 64 | | | orange |
| 65 | | | reddish dark brown |
| 66 | | | violet brown |

TABLE 3-continued

| Ex. | I | II | Shade |
|---|---|---|---|
| 67 | [naphthalene with OH, azo-linked to benzene with OH, SO₃H, O₂N] | [benzene-N=N-C(=N-NH-CO-C(OH)(CH₃))-S-benzene; with OH, HO₃S, NO₂ substituents] | medium brown |
| 68 | [naphthalene with OH, HO₃S, azo-linked to naphthalene with OH, NO₂] | [benzene-N=N-C(=N-NH-CO-C(OH)(CH₃))-S-benzene; with OH, HO₃S, NO₂ substituents] | dark brown |

Dyeing Procedure for Wool 100 parts of woollen knitting yarn are put at 50° C. into a dye bath which contains 2 parts of the dye of Example 29, 4 parts of ammonium sulfate and 2 parts of a levelling agent in 4000 parts of water. The bath is brought to the boil over 45 minutes and kept at boiling temperature for a further 45 minutes. The brown-dyed yarn is removed from the bath, thoroughly rinsed with cold water and dried.

Dyeing Procedure for Leather 100 parts of garment suède leather (dry weight) are wet back at 50° C. for 2 hours in a solution of 1000 parts of water and 2 parts of 24% ammonia and subsequently dyed for 1 hour at 60° C. in a solution of 1000 parts of water, 2 parts of 24% ammonia and 6 parts of the dye of Example 1. A solution of 40 parts of water and 4 parts of 85% formic acid is then added and dyeing is continued for a further 30 minutes. The leather is then thoroughly rinsed and, if desired, treated for 30 minutes at 50° C. with 2 parts of a dicyandiamine/formaldehyde condensation product.

Other types of suède leather as well as glove leather may be dyed in the same manner.

The brown dyeings so obtained have good fastness properties and good covering power.

Dyeing Procedure for Polyamide 100 parts of textured polyamide fabric (nylon 6,6) are put at 40°–50° C. into a dye bath which contains 2 parts of the dye of Example 38 and 3 parts of ammonium sulfate in 4000 parts of water. The bath is brought to the boil over 45 minutes and kept at boiling temperature for a further 60 minutes. The polyamide fabric is removed from the bath after cooling to 80° C., and then rinsed and dried. The dyeing produced on the polyamide fabric is fast brown.

What is claimed is:

1. A 1:2-chromium complex dye of the formula

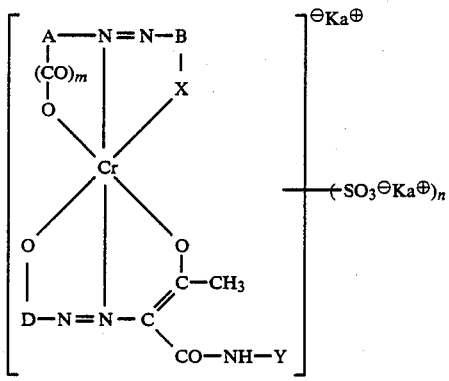

wherein

A and D are each independently of the other a benzene or naphthalene radical of a diazo component, which component carries the hydroxyl or carboxyl group in the ortho-position to the azo group;

B is the radical of a coupling component which carries the group X adjacent to the azo group;

X is oxygen or a radical of the formula —NR—, in which R is hydrogen or $C_1$–$C_4$alkyl;

Y is a radical of the formula

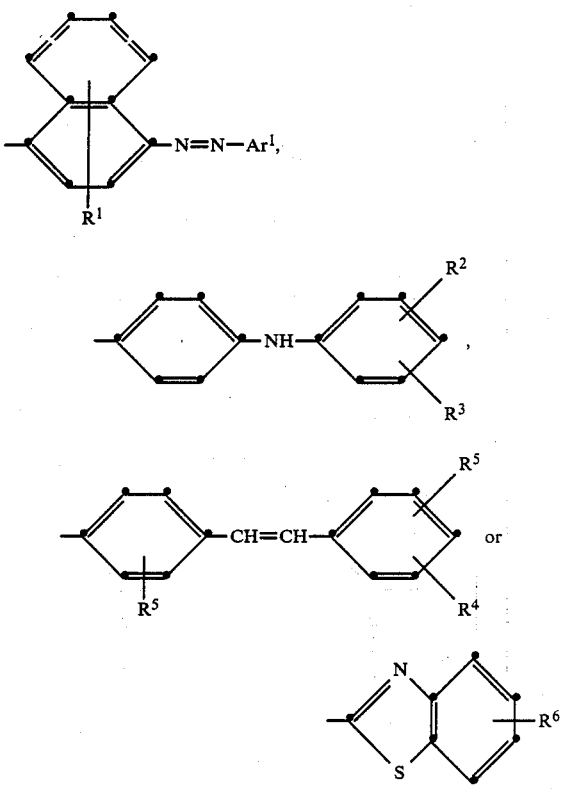

in which formulae $R^1$ and $R^5$ are each independently of the other hydrogen or sulfo, $R^4$ is hydrogen or nitro, $R^6$ is hydrogen, methyl, methoxy or chlorine and $R^2$ and $R^3$ are each independently of the other hydrogen, halogen, nitro or sulfo;

$Ar^1$ is a benzene or naphthalene radical which is unsubstituted or substituted by halogen, nitro, sulfo, $C_1$–$C_4$alkyl or $C_1$–$C_4$-alkoxy;

m is 0 or 1;

n is an integer from 1 to 7; and $Ka^+$ is a cation;

with the proviso that if Y is phenylaminophenyl, B is a substituted resorcinol radical of the formula

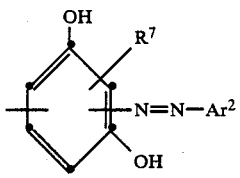

wherein $R^7$ is hydrogen, $C_1$–$C_4$alkyl, halogen, carboxy or sulfo and $Ar^2$ is a benzene or naphthalene radical which is unsubstituted or substituted by halogen, nitro, sulfo, $C_1$–$C_4$-alkyl or $C_1$–$C_4$-alkoxy.

2. A dye according to claim 1, wherein A and D are each independently of the other the radical of a 1-hydroxy-2-aminobenzene, which radical is unsubstituted or substituted by halogen, nitro, sulfo or low molecular alkyl, or is the radical of a 1-amino-2-hydroxy-4- sulfonaphthalene, which radical is unsubstituted or substituted in the 6-position by chlorine, nitro or sulfo.

3. A dye according to claim 1, wherein B is a 1- or 2-naphthol which is unsubstituted or substituted by amino or sulfo; a substituted resorcinol of the formula

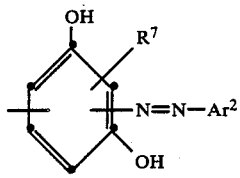

wherein $R^7$ is hydrogen, $C_1$-$C_4$alkyl, halogen, carboxy or sulfo and $Ar^2$ is a benzene or naphthalene radical which is unsubstituted or substituted by halogen, nitro, sulfo, $C_1$-$C_4$-alkyl or $C_1$-$C_4$-alkoxy; or B is a 1- or 2-naphthylamine which is unsubstituted or substituted by sulfo; or is p-($C_1$-$C_6$)alkylphenol, 3-methyl-5-pyrazolone, 1-phenyl-3-methyl-5-pyrazolone or acetoacetanilide, the phenyl moiety of which last two compounds is unsubstituted or substituted by $C_1$-$C_4$alkyl, $C_1$-$C_4$-alkoxy, chlorine, nitro or sulfo.

4. A dye according to claim 1, wherein the ring D is a 1-hydroxy-2-aminobenzene which is unsubstituted or further substituted by nitro, sulfo, chlorine or methyl.

5. A dye according to claim 1, wherein $R^1$ is hydrogen.

6. A dye according to claim 1, wherein $R^4$ is nitro.

7. A dye according to claim 1, wherein $R^5$ is sulfo.

8. A dye according to claim 6, wherein the sulfo groups are in the ortho-position to the vinylene group, and the nitro group is in the para-position to the vinylene group.

9. A dye according to claim 1, wherein $Ar^1$ is a benzene or naphthalene radical, which radical is unsubstituted or substituted by chorine, nitro, sulfo, $C_1$-$C_4$alkyl or $C_1$-$C_4$alkoxy.

10. A dye according to claim 9, wherein $Ar^1$ is phenyl which is unsubstituted or substituted by chlorine, nitro, methyl, methoxy or sulfo, or naphthyl which is unsubstituted or substituted by sulfo.

11. A dye according to claim 1, which contains 1 to 3 sulfo groups.

12. A dye according to claim 1, wherein Y is a radical of the formula

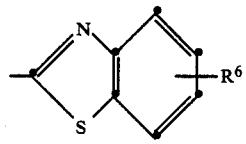

13. A dye according to claim 12, wherein $R^6$ is hydrogen.

14. A dye according to claim 1, wherein B is the radical of 2-naphthol.

15. A dye according to claim 1, B is the radical of a coupling component which carries the group X adjacent to the azo group and which carries no further substituent linked through an azo group, and Y is a radical of one of the formulae

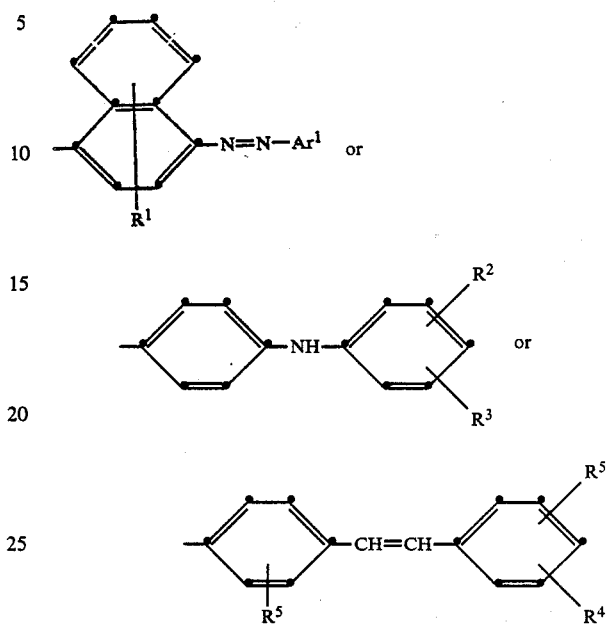

16. A dye according to claim 1, X is oxygen, B is the radical of a substituted resorcinol of the formula

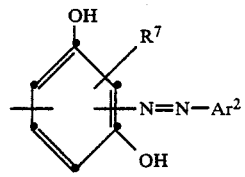

and Y is a radical of one of the formulae

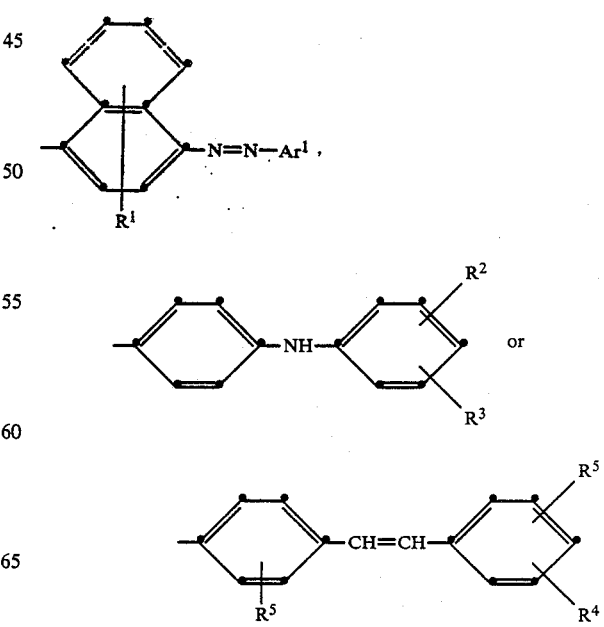

17. A dye according to claim 16, wherein $R^7$ is hydrogen.

18. A dye according to claim 16, wherein $Ar^2$ is a benzene or naphthalene radical, which radical is unsubstituted or substituted by chlorine, nitro, sulfo, $C_1$-$C_4$alkyl or $C_1$-$C_4$alkoxy.

19. A dye according to claim 18, wherein $Ar^2$ is phenyl which is unsubstituted or substituted by chlorine, nitro, methyl, methoxy or sulfo, or naphthyl which is unsubstituted or substituted by sulfo.

20. A dye according to claim 1, of the formula

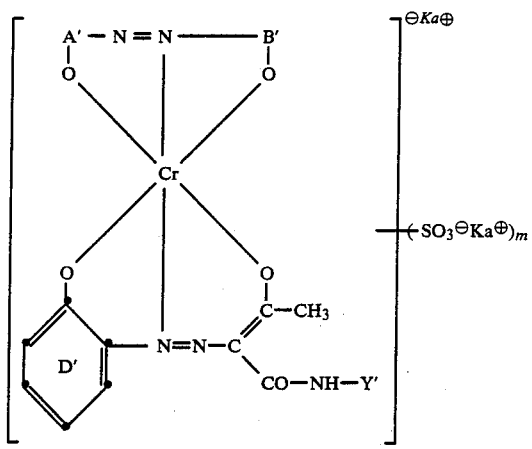

wherein
A' is the radical of a 1-hydroxy-2-aminobenzene which is unsubstituted or substituted by halogen, nitro, sulfo or low molecular alkyl or alkoxy, or is the radical of a 1-amino-2-hydroxy-4-sulfonaphthalene which is unsubstituted or substituted in the 6-position by nitro, B' is a 1- or 2-naphthol which is unsubstituted or substituted by amino or sulfo; a 1- or 2-naphthylamine which is unsubstituted or substituted by sulfo; or is p-$C_1$-$C_6$alkylphenol, 1-phenyl-3-methyl-5-pyrazolone or acetoacetanilide, the phenyl moiety of which last two compounds is unsubstituted or substituted by $C_1$-$C_4$alkyl, $C_1$-$C_4$alkoxy, chlorine, nitro or sulfo, Y' is a radical of the formula

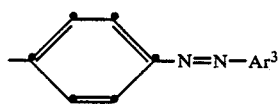 (8)

or of the formula

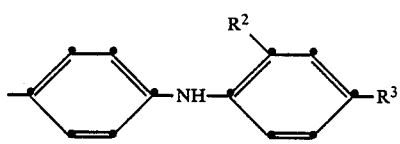 (9)

or of the formula

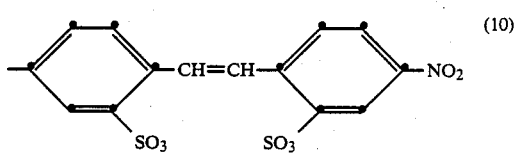 (10)

in which formulae $Ar^3$ is a benzene or naphthalene series, which radical is unsubstituted or substituted by chlorine, nitro, sulfo, $C_1$-$C_4$alkyl or $C_1$-$C_4$alkoxy, and $R^2$ and $R^3$ are different from each other and are each nitro or sulfo, m is 1, 2 or 3, $Ka^\oplus$ is a cation, and the ring D' is unsubstituted or further substituted by sulfo, nitro, chlorine, methyl or methoxy.

21. A 1:2 chromium complex dye of the formula

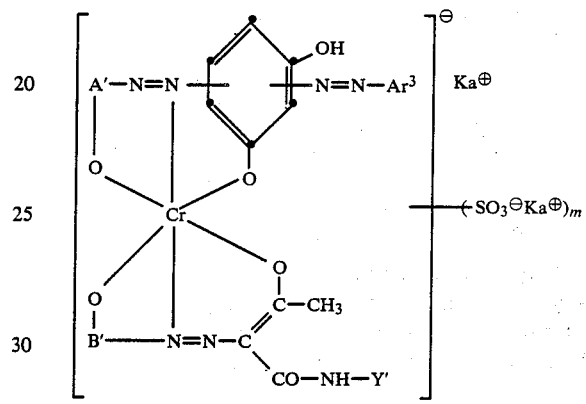

wherein
A' and B' are each independently of the other the radical of a 1-hydroxy-2-aminobenzene which is unsubstituted or substituted by halogen, nitro, sulfo or low molecular alkyl or alkoxy, or is the radical of a 1-amino-2-hydroxy-4-sulfonaphthalene which is unsubstituted or substituted in the 6-position by nitro, Y' is a radical of the formula

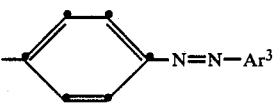

or of the formula

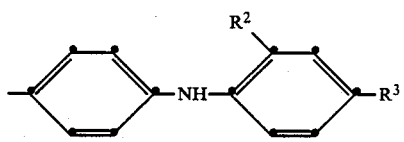

or of the formula

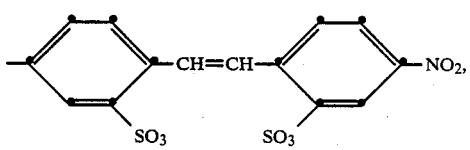

$Ar^3$ is a benzene or naphthalene radical which radical is unsubstituted or substituted by chlorine, nitro, sulfo, $C_1$-$C_4$alkyl or $C_1$-$C_4$alkoxy, $R^2$ and $R^3$ are different from each other and are each nitro or sulfo, m is 1, 2 or 3, and $Ka^\oplus$ is a cation.